that said acetic acid bacteria substantially does not proliferate, and a method of reducing an off-flavor in foods containing alcohols and medium chain aldehydes characterized in that said foods are brought into contact with acetic acid bacteria of which membrane-bound alcohol dehydrogenase has been deactivated.

United States Patent [19]

Ameyama et al.

[11] Patent Number: 4,975,289

[45] Date of Patent: Dec. 4, 1990

[54] METHOD FOR REDUCING OFF-FLAVOR IN FOOD MATERIALS WITH ACETIC ACID BACTERIA

[75] Inventors: Minoru Ameyama; Osao Adachi, both of Yamaguchi; Atsushi Yasuda, Osaka; Yukihiro Nomura, Nara, all of Japan

[73] Assignee: House Food Industrial Company Limited, Higashiosaka, Japan

[21] Appl. No.: 411,250

[22] Filed: Sep. 25, 1989

Related U.S. Application Data

[63] Continuation of Ser. No. 60,664, Jun. 11, 1987, abandoned.

[30] Foreign Application Priority Data

Jun. 13, 1986 [JP] Japan ................................ 61-137745
Mar. 9, 1987 [JP] Japan ................................ 62-53414
Mar. 9, 1987 [JP] Japan ................................ 62-53855

[51] Int. Cl.$^5$ ............................ A23L 1/00; A23L 1/20; A23L 1/31; A23L 1/325
[52] U.S. Cl. .......................................... 426/7; 426/11; 426/12; 426/15; 426/16; 426/17; 426/20; 426/42; 426/43; 426/51; 426/52; 426/56; 426/61
[58] Field of Search ................. 426/7, 11, 12, 15, 46, 426/16, 52, 51, 56, 61, 44, 330-330.4, 17, 20, 42, 43; 435/823

[56] References Cited

U.S. PATENT DOCUMENTS 4,661,356  4/1987  Okuhara .............................. 426/17

FOREIGN PATENT DOCUMENTS 2356664  1/1978  France .
59-55143  3/1984  Japan .

OTHER PUBLICATIONS

Patent Abstracts of Japan, vol. 11, No. 282 (C-446) [2729], Sep. 11, 1987; JP-A-62 79 739 (Lion Corp), 13-04-1987, Abstract.
Patent Abstracts of Japan, vol. 6, No. 85 (C-103) [1963], May 22, 1982; JP-A-57 18 986 (Tanabe Seiyaku K.K.), 30-01-1982, Abstract.
Patent Abstracts of Japan, vol. 8, No. 150 (C-233) [1587], Jul. 12, 1984; JP-A-59-55 143 (Nakano Suten K.K.), 30-03-1984, Abstract.
Patent Abstracts of Japan, vol. 5, No. 49 (C-49) [721], Apr. 8, 1981; JP-A-56 5092 (Fuji Zouki Seiyaku K.K.), 20-01-1981, Abstract.
Patent Abstracts of Japan, vol. 7, No. 273 (C-198) [1418], Dec. 6, 1983; JP-A-58 152 479 (Nakano Suten K.K.), 10-09-1983, Abstract.

*Primary Examiner*—Marianne Cintins
*Attorney, Agent, or Firm*—Oblon, Spivak, McClelland, Maier & Neustadt

[57] ABSTRACT

The present invention relates to a method of reducing an off-flavor in foods containing medium chain aldehydes characterized in that said foods are brought into contact with acetic acid bacteria or immobilized acetic acid bacteria (*Acetobacter aceti, Gluconobacter suboxydans*) in a state that said acetic acid bacteria substantially does not proliferate, and a method of reducing an off-flavor in foods containing alcohols and medium chain aldehydes characterized in that said foods are brought into contact with acetic acid bacteria of which membrane-bound alcohol dehydrogenase has been deactivated.

19 Claims, 15 Drawing Sheets

METHOD FOR REDUCING OFF-FLAVOR IN FOOD MATERIALS WITH ACETIC ACID BACTERIA

This application is a continuation of application Ser. No. 07/060,664, filed on June 11, 1987, now abandoned.

BACKGROUND OF THE INVENTION

1. Field of the Invention

The present invention relates to a method for reducing an off-flavor in food material with acetic acid bacteria, and particularly to a method for reducing an off-flavor in foods and liquors containing medium chain aldehydes by using acetic acid bacteria.

2. Prior Art

A method that employs the aldehyde dehydrogenase which is extracted from a bovine liver and purified has been previously known as a method of reducing an off-flavor of foods which is particularly caused by medium chain aldehydes such as n-hexanal (Agricultural Chemical society of Japan, 54(6), 446-448 (1980)).

Since the above-described method, however, requires the use of expensive AND as a coenzyme and the enzyme must be extracted from bovine liver, followed by purification, this method is very costly to carry out.

In consideration of the above-mentioned situation, the inventors have made investigations into a method which is capable of reducing an off-flavor in foods at low cost and focused on acetic acid bacteria.

Acetic acid bacteria is disclosed in, for example, Japanese Patent Publication No. 24751/1982 (Japanese Patent Laid-Open Application No. 5092/1981) and Japanese Patent Laid-Open Application No. 55143/1984.

Japanese Patent Publication No. 24751/1982 discloses membrane-bound aldehyde dehydrogenase localized in the cell membranes of acetic acid bacteria (Acetobacter aceti IFO 3284 and Gluconobacter suboxydans IFO 12528).

On the other hand, Japanese Patent Laid-Open Application No. 55143/1984 discloses a method of producing lactic acid beverages characterized by adding carbon sources to soybean milk, said carbon sources can be used as nutrients by acetic acid bacteria, and inoculating acetic acid bacteria into the mixture obtained so that fermentation accompanied by proliferation of the acetic acid bacteria is effected. It also states that the lactic acid beverages obtained by this method do not produce any grassy smell.

The inventors therefore performed supplementary investigations of the method described in Japanese Patent Laid-Open Application No. 55143/1984 with a view to reducing the grassy smell of soybean milk As a result, this type of smell was specifically reduced in the soybean milk obtained. The soybean, however, had to a remarkable extent other unpleasant odors apart from the grassy smell (a sour flavor, etc.) and tasted sour. In other words, the method described in Japanese Patent Laid-Open Application No. 55143/1984 was unable to reduce the grassy smell while at the same time maintaining the taste, flavor and texture of the soybean milk.

Therefore, it is an object of the present invention to provide a method which is capable of reducing an unpleasant odor that is thought to be caused by medium chain aldehydes, without changing the taste, flavor or texture of the foods.

Another object of the present invention is to provide a method which makes it possible to continuously reduce an off-flavor in liquid foods containing medium chain aldehydes, without contamination of acetic acid bacteria in the foods.

In regard to an off-flavor attributable to the presence of medium chain aldehydes in alcoholic beverages, the following description is found in Journal of the Agricultural Chemical society of Japan, Vol. 52, No. 9, 1978, line 2, left column to line 5, right column.

"Fresh aroma of bottled or canned beer is progressively lost and instead off-flavor becomes remarkable. The off-flavor is attributable to the presence of various aldehydes such as trans-2-nonenal, and studies have also been made as to the mechanisms by which such compounds are produced According to one of the theories, lipid of barley is changed by an enzymatic deterioration during processing of barley or during preparation in the process for producing beer, and a part of the product by the enzymatic deterioration which is in soluble state is transferred to the product beer so as to gradually produce aldehydes such as trans-2-nonenal during preservation of the bottled or canned beer." This description shows that the off-flavor attributable to presence of medium chain aldehydes has been recognized.

Meanwhile, the present applicant has developed, as a method for reducing the off-flavor in foods attributable to presence of medium chain aldehydes, a method which makes use of acetic acid bacteria, and has filed a patent application on this method as Japanese Patent Application No. 137745/1986. The present applicant, therefore, attempted to reduce the off-flavor attributable to the presence of medium chain aldehydes in alcohol containing foods, by making use of the above-mentioned method. This attempt, however, encountered a problem in that the alcohol content in the alcohol containing foods is undesirably reduced, though the off-flavor due to the presence of medium chain aldehydes is reduced appreciably.

A further object of the present invention is to provide a method which makes it possible to reduce the off-flavor attributable to the presence of medium chain aldehydes in alcohol containing foods such as liquors without causing any reduction in the alcohol content thereof.

SUMMARY OF THE INVENTION

The first embodiment of the present invention relates to a method of reducing an off-flavor in foods containing medium chain aldehydes characterized in that said foods are brought into contact with acetic acid bacteria in such state that said acetic acid bacteria substantially does not proliferate.

The second embodiment of the present invention relates to a method of reducing an off-flavor in foods containing medium chain aldehydes characterized in the said foods are brought into contact with immobilized acetic acid bacteria in such state that said acetic acid bacteria substantially does not profilerate.

The third embodiment of the present invention relates to a method of reducing an off-flavor in foods containing alcohols and medium chain aldehydes characterized in that said foods are brought into contact with acetic acid bacteria whose membrane-bound alcohol dehydrogenase has been deactivated by heat treatment at a temperature of from 60 to 80° C.

DESCRIPTION OF THE INVENTION

Figure 1:
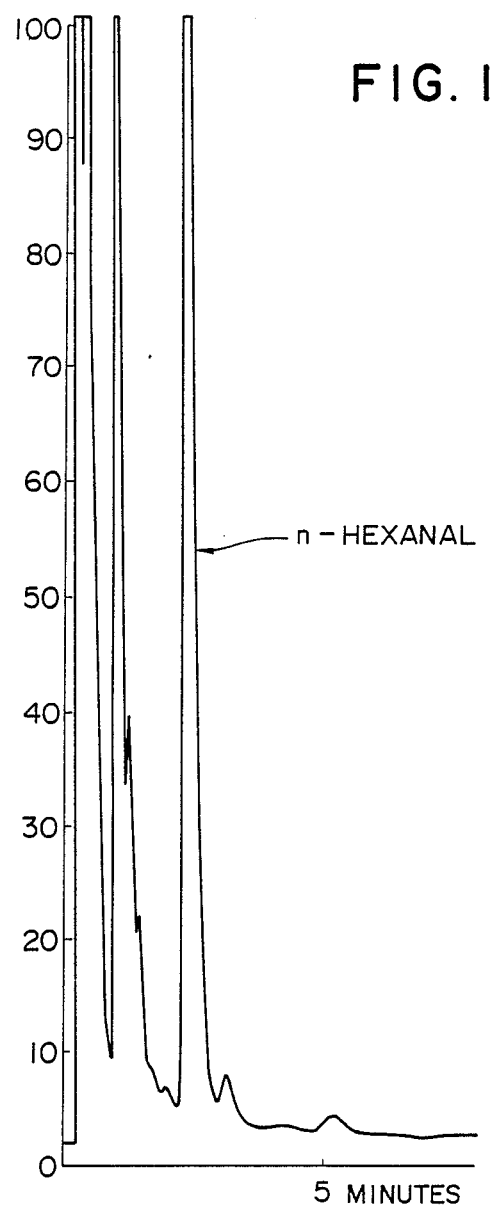
FIG. 1 is a gas chromatogram of the headspace gas when no solution of acetic acid bacteria is added to soybean milk.

A first embodiment of the present invention is described below.

The foods whose an off-flavor is reduced in the first embodiment of the present invention are those containing medium chain aldehydes. Any foods can be treated insofar as the foods contains medium chain aldehydes, regardless of the content thereof. Examples of such foods containing medium chain aldehydes include soybean milk, fruit juices, lactic acid beverages, wheat flour dough, dried pregelatinized rice, various retort foods (curry, stew and so on), processed marine products such as types of fish paste, boiled fish paste, and ground fish meat and processed livestock products such as ham and sausage. Examples of medium chain aldehydes contained in the foods include n-hexanal, n-heptanal, n-octanal, n-nonanal and n-decanal.

In the first embodiment of the present invention, these foods containing medium chain aldehydes are brought into contact with acetic acid bacteria, provided that this contact is made in a state wherein the acetic acid bacteria substantially does not proliferate.

Such a state wherein the acetic acid bacteria substantially does not proliferate may be (i) a state wherein the acetic acid bacteria itself is growable but not accompanied by proliferation, depending upon the used contact conditions, or (ii) a state wherein the acetic acid bacteria itself is ungrowable because it has been heated, dried or ground.

Ungrowable acetic acid bacteria can be obtained by, for example, heating acetic acid bacteria at 40 to 60° C. for 30 to 60 minutes, mechanically grinding it, or subjecting it to lyophilization.

On the other hand, a contact condition in which growable acetic acid bacteria is not accompanied by proliferation is, for example, one wherein the time of contact between the acetic acid bacteria and the food is 5 hours or less. The acetic acid bacteria does not proliferate to any substantial extent in this time and any off-flavors or sour taste newly produced by the proliferation of acetic acid bacteria can thus be controlled substantially to a degree which cannot be detected.

In addition, there is no limit to the kinds of acetic acid bacteria that may be used in the present invention. Examples of acetic acid bacteria are shown below.

(Genus Acetobacter)
*Acetobacter aceti* IFO 3281
*Acetobacter aceti* IFO 3283
*Acetobacter aceti* IFO 3284
*Acetobacter acetigenus* IFO 3279
*Acetobacter acetosus* IFO 3296
*Acetobacter ascendens* IFO 3188
*Acetobacter ascendens* IFO 3299
*Acetobacter aurantius* IFO 3245
*Acetobacter aurantius* IFO 3247
*Acetobacter aurantius* IFO 3248
*Acetobacter kutzingianus* IFO 3222
*Acetobacter rancens* IFO 3297
*Acetobacter rancens* IFO 3298
*Acetobacter xylinus* IFO 3288
*Acetobacter pasteurianus* 3223
*Acetobacter turbidans* IFO 3225

(Genus Gluconobacter)
*Gluconobacter melanogenus* IFO 3294
*Gluconobacter oxydans* IFO 3287
*Gluconobacter dioxyacetonicus* IFO 3271
*Gluconobacter dioxyacetonicus* IFO 3272
*Gluconobacter dioxyacetonicus* IFO 3274
*Gluconobacter cerinus* IFO 3262
*Gluconobacter cerinus* IFO 3263
*Gluconobacter cerinus* IFO 3264
*Gluconobacter cerinus* IFO 3265
*Gluconobacter cerinus* IFO 3266
*Gluconobacter cerinus* IFO 3267
*Gluconobacter cerinus* IFO 3268
*Gluconobacter cerinus* IFO 3269
*Gluconobacter cerinus* IFO 3270
*Gluconobacter gluconicus* IFO 3285
*Gluconobacter gluconicus* IFO 3286
*Gluconobacter albidus* IFO 3251
*Gluconobacter albidus* IFO 3253
*Gluconobacter suboxydans* IFO 3290
*Gluconobacter suboxydans* IFO 3291
*Gluconobacter suboxydans* IFO 12528

In the first embodiment of the present invention, acetic acid bacteria is brought into contact with the food containing medium chain aldehydes by a method as described below.

When ungrowable acetic acid bacteria is used, the acetic acid bacteria is added to the food to be reduced the off-flavor therein and uniformly mixed therewith so as to enable contact between the acetic acid bacteria and the food. In this case, the acetic acid bacteria added to the food is not necessarily required to be removed therefrom after contact, though it may be separated and removed therefrom.

On the other hand, when the growable acetic acid bacteria is brought into contact with a food for a given time, the acetic acid bacteria is uniformly mixed with the food and, if required, after agitation for the given time, then caused to die out by heating (for example, at 80 to 100° C. for 3 to 7 minutes, preferably at 100° C. for 5 minutes).

In either of the above-described cases, the contact between the acetic acid bacteria and the food containing medium chain aldehydes is suitably performed at a temperature of about 5 to 80° C., preferably 30 to 60° C., and a pH of 8.5 or less, preferably within the range of 2.5 to 7.5.

The second embodiment of the present invention is described below.

The foods with the off-flavor to be reduced by the method of the present invention are liquid foods containing medium chain aldehydes. Any foods can be treated insofar as the foods contain medium chain aldehydes, regardless of the content thereof. Examples of such foods containing medium chain aldehydes include soybean milk, cow milk, soup, fruit juice, alcoholic beverage, beer and so forth, as well as other liquid food materials such as blood protein.

Examples of medium chain aldehydes contained in the foods include n-hexanal, n-heptanal, n-octanal, n-nonanal and n-decanal.

There is no limit to the kinds of acetic acid bacteria that may be used in the present invention. Any of acetic acid bacterias exemplified in the first embodiment of the present invention may be used.

Any suitable method capable of immobilizing acetic acid bacteria can be used as the method for immobilizing acetic acid bacteria in the second embodiment of the present invention. For instance, (1) carrier bonding method such as covalent bonding, ion bonding and physical adsorption, (2) crosslinking and (3) entrapping method such as grid-type or microcapsule-type entrapping method are used suitably. Amongst these method, entrapping method is used most suitably because this method ensures a high immobilizing yield, while eliminating undesirable effects such as clogging during processing and mixing of freed immobilized acetic acid bacteria into the liquid foods containing medium chain aldehydes.

A practical example of the entrapping method makes use of alginic acid salt as a gelling agent. In this method, an aqueous solution of alginic acid salt with bacteria dispersed therein is gelated by an aqueous solution of calcium chloride, so that the bacteria is entrapped in the gel.

Another method makes use of κ-carrageenan. According to this method, an aqueous solution of κ-carrageenan with bacteria dispersed therein is gelated by an aqueous solution of potassium chloride or an aqueous solution of calcium chloride, so that the bacteria is entrapped in the gel. When the liquid food containing medium chain aldehydes contains protein as in the case of a soybean milk or cow milk, it is preferred to use κ-carrageenan as the gelling agent and to gelate an aqueous solution of κ-carrageenan with bacteria dispersed therein with an aqueous solution of potassium chloride, in order to avoid any aggregation of protein which otherwise may be caused by calcium salt.

According to the invention, the food containing medium chain aldehydes is made to contact with immobilized acetic acid bacteria. The contact, however, must be conducted under such a condition that the immobilized acetic acid bacteria does not proliferate. The condition where the immobilized acetic acid bacteria does not proliferate includes the following two cases: namely, (i) proliferation is prohibited by suitable selection of contact condition, though the acetic acid bacteria is growable, and (ii) the acetic acid bacteria is ungrowable because they have heated, dried or pulverized.

The ungrowable acetic acid bacteria can be obtained by subjecting, before immobilization, the acetic acid bacteria to a heat treatment at 40 to 60° C. for 30 to 60 minutes, mechanical grinding or lyophilization.

According to the invention, the contact between the immobilized acetic acid bacteria and the foods containing medium aldehyde is carried out, for example, in the following manner.

When ungrowable bacteria is used, immobilized acetic acid bacteria is added to the object foods and are blended uniformly so as to allow the immobilized acetic acid bacteria to contact with the foods. The mixed immobilized acetic acid bacteria is removed from the foods after elapse of a predetermined time, e.g., 5 minutes to 5 hours. The contact also may be effected by causing the liquid foods to pass through a column charged with immobilized acetic acid bacteria.

When growable bacteria is used, the immobilized acetic acid bacteria is held in contact with the foods for a predetermined time which is 10 hours or less. Thus, the immobilized acetic acid bacteria is mixed with the foods and is removed from the foods after, as required, by blending for a predetermined time. The contact also may be effected by causing the foods to pass through a column charged with the immobilized acetic acid bacteria such that the foods stay in the column for a time which is 10 hours or less. The reason why the time is limited to 10 hours or less is that this short time materially prevents proliferation so that any unpleasant odor or sour taste which may be caused by proliferation of the acetic acid bacteria can be suppressed to a substantially nondetectable level. The contact time of 10 hours is the maximum time, which is allowed when the contact is conducted at 20 to 35° C. and at pH 3.5 to 7. Thus, a longer contact time will be allowed according to the condition.

In each of these cases, the contact between the acetic acid bacteria and the foods containing medium chain aldehyde is conducted at a temperature not higher than 70° C., preferably between 5 and 60° C., and at pH not higher than 8.0, preferably between 3.0 and 7.0. The method of the second embodiment of the present invention for processing liquid foods containing medium chain aldehydes may be carried out in batch manner or even in a continuous manner.

The third embodiment of the present invention will be more fully understood from the following description.

The foods which have an off-flavor to be reduced by the method of the third embodiment of the present invention are foods which contain alcohols and medium chain aldehydes. The foods containing alcohols and medium chain aldehydes include all the foods which containing an alcohol and also medium chain aldehyde, regardless of aldehyde content. Typical examples of such foods are alcoholic beverages. Examples of such alcoholic beverages are beer, sake, wine, whiskey, vodka, low-class distilled spirits, liquor, brandy and so forth, as well as half-finished products of such alcoholic beverages. The invention also is applicable to various foods which make use of such alcoholic beverages.

Examples of such foods include desserts added with the alcoholic beverages (ice creams, Bavarian cream, jellies and the like), liquors (various cocktails), seasonings (for example, dressings containing wine) and the like.

Examples of the medium aldehydes are n-hexanal, n-heptanal, n-octanal, n-nonanal, n-decanal, trans-2-nonenal and so on.

According to the third embodiment of the present invention, foods containing alcohols and medium chain aldehydes are made to contact with acetic acid bacteria. It is critical that, before such a contact is carried out, the acetic acid bacteria is subjected to a heat treatment conducted at 60 to 80° C., preferably 60 to 65° C., so as to inactivate any membrane-bound alcohol dehydrogenase in the acetic acid bacteria.

Time of heat treatment can be selected according to the heat treatment temperature and suitably ranges from 5 to 30 minutes.

In general, there is a tendency that the effect for reducing the off-flavor is decreased as the heat treating temperature exceeds 80° C., whereas any heat treating temperature below 60° C. is ineffective in inactivation of the membrane-bound alcohol dehydrogenase resulting in a reduction in the alcohol content in the foods.

In order to make these facts to be understood more clearly, a description will be made as to the result of a comparison test.

COMPARISON TEST

Effect of heat treating temperature on medium chain aldehydes oxidizing activity of acetic acid bacteria:

Water in amount of 20 ml was added to 4 g of wet acetic acid bacteria (*Gluconobacter suboxydans* IFO 12528) so as to uniformly disperse the bacteria, thus obtaining a bacteria solution. Then, 1 ml of this solution was collected in each of a plurality of test tubes, and the thus obtained samples were left for 15 minutes at different temperatures of 30, 40, 50, 60, 65, 70, 80, 90 and 100° C., followed by cooling so as to obtain treated bacterial solutions.

Meanwhile, a soybean milk was prepared by diluting 100 g of defatted soybean in water by six times, grinding the mixture by a mixer for 1 minute, and effecting heat treatment at 100° C. for 10 minutes.

Figure 16:
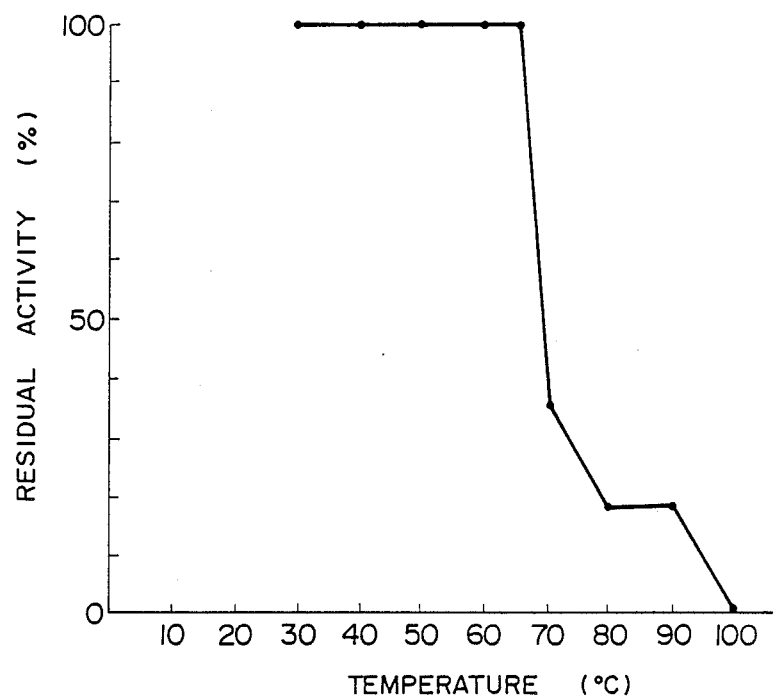
FIG. 16 is a graph showing the effect of heat treating temperature on medium chain aldehydes oxidizing activity.

Then, 20 ml of the soybean milk was received in each of vials of 50 ml capacity, and 0.25 ml of the treated bacteria solution was added to the soybean milk. The mixture was left for reaction at 30° C. for 30 minutes, followed by preservation at 80° C. for 15 minutes. Then, 5 ml of headspace gas was extracted and was subjected to gas-liquid chromatography (referred to as GLC hereinafter) conducted at column temperature of 100° C., detection temperature of 250° C., sensitivity of $10^3 \times 16$ and $N_2$ gas flow rate of 40 ml/min., in order to study the effect of heat treating temperature on n-hexanal oxidizing activity. The result is shown in FIG. 16, using the activity at 30° C. as 100% activity.

Effect of heat treating temperature on alcohol oxidizing activity of membrane-bound alcohol dehydrogenase resided in acetic acid bacteria:

Water in amount of 20 ml was added to 4 g of wet acetic acid bacteria (*Gluconobacter suboxydans* IFO 12528) so as to uniformly disperse the bacteria, thus obtaining a bacteria solution. Then, 1 ml of this solution was collected in each of a plurality of test tubes, and the thus obtained samples were left for 15 minutes at different temperatures of 30, 40, 50, 60, 70, 80, 90 and 100° C., followed by cooling so as to obtain treated bacterial solutions.

Meanwhile, 0.03% ethanol solution 20 ml was collected in each of vials of 50 ml capacity, and 0.25 ml of the treated bacteria solution was added to the ethanol solution. The mixture was left for reaction at 30° C. for 120 minutes, followed by preservation at 80° C. for 15 minutes. The reaction products were then cooled and left at room temperature for 15 minutes. Then, 2 $\mu l$ of each reaction liquid was extracted and was subjected to GLC conducted at column temperature of 100° C., detection temperature of 250° C., sensitivity of $10^3 \times 16$ and $N_2$ gas flow rate of 40 ml/min., in order to study the effect of heat treating temperature on ethanol oxidizing activity. The result is shown in FIG. 17, using the activity at 30° C. as 100% activity.

Figure 17:
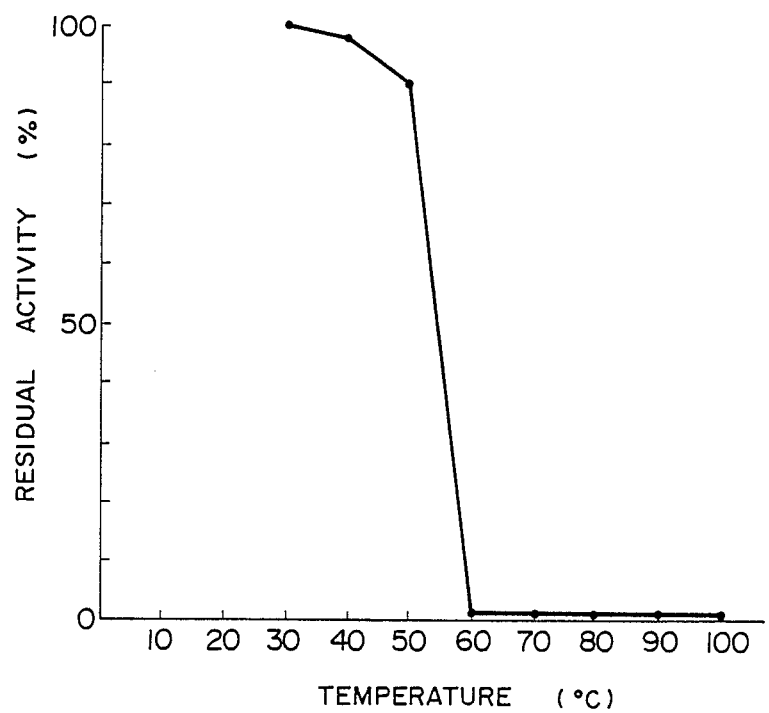
FIG. 17 is a graph showing the effect of heat treating temperature on alcohol oxidizing activity

From FIG. 16, it is understood that acetic acid bacteria has an appreciable oxidation activity of medium chain aldehydes at a temperature of 30 to 80° C., while FIG. 17 shows that the alcohol oxidizing activity of acetic acid bacteria is deactivated by the heat treatment at a temperature of 60° C. or more. These facts clearly suggest that medium chain aldehydes in alcohol containing foods can be decomposed without being accompanied by any reduction in the alcohol content, by effecting heat treatment of the acetic acid bacteria at 60 to 80° C. in advance of the treatment of the alcohol containing foods. That is, the reduction in the alcohol content of the foods is attributable to the action of membrane-bound alcohol dehydrogenase residing in acetic acid bacteria. The heat treatment conducted in the above temperature range is suitable to deactivate the membrane-bound alcohol dehydrogenase without causing any reduction in the activity of acetic acid bacteria for reducing the off-flavor produced by medium chain aldehydes. As a result, the reduction of the off-flavor can be effected by using the acetic acid bacteria previously heat treated under the above-mentioned condition without causing any reduction in the alcohol content in the foods.

There is no limit to the kinds of acetic acid bacteria that may be used in the present invention. Any of acetic acid bacterias exemplified in the first embodiment of the present invention may be used.

According to the third embodiment of the present invention, the contact between the acetic acid bacteria and the foods containing alcohols and medium chain aldehydes is effected by, for example, either one of the following two methods.

According to a first method, a bacteria solution with acetic acid bacteria dispersed therein or, alternatively, acetic acid bacteria per se is added to the foods containing alcohols and medium chain aldehydes and the mixture is blended uniformly so as to allow the acetic acid bacteria to contact with the foods. In this case, it is not essential that the acetic acid bacteria is removed from the foods after the contact. However, when the foods is a transparent one, it is desirable to remove the acetic acid bacteria by means of, for example, a membrane filter . According to a second method, the acetic acid bacteria is immobilized and the immobilized acetic acid bacteria is made to contact with the foods containing alcohols and medium chain aldehydes. The immobilization of acetic acid bacteria can be effected by any suitable method described in the second embodiment of the present invention. Examples of such method include (1) carrier bonding method such as covalent bonding, ion bonding and physical adsorption, (2) crosslinking and (3) entrapping method such as grid-type or microcapsule-type entrapping method Amongst these method, entrapping method is used most suitably because this method ensures a high immobilizing yield, while eliminating undesirable effects such as clogging during processing.

When the first method for causing the acetic acid bacteria to contact with the food is employed, the contact is conducted at a temperature of about 5 to 80° C., preferably 30 to 60° C., and at pH of 8.5 or less, preferably 2.5 to 7.5. When the second contact method is adopted, the contact is conducted preferably at a temperature of 5 to 60° C. and pH of 8.0 or less, preferably 3.0 to 7.0.

EXAMPLES

The present invention is described in detail below with reference to examples.

EXAMPLE 1 (SOYBEAN MILK)

20 ml of water was added to 4 g of living wet bacteria bodies of *Gluconobacter suboxydans* IFO 12528 and the bacteria was uniformly dispersed to form a bacteria solution.

Meanwhile, 600 ml of water was added to 100 g of defatted soybeans The soybeans were then ground in a mixer for 1 minute, filtered, and then heated under conditions of 100° C. for 10 minutes to obtain a soybean milk (Sample A).

2.5 ml of the bacteria solution obtained above was added to 200 ml of the soybean milk obtained and then kept contact of the soybean milk with the bacteria at 30° C. for 30 minutes. The pH of the soybean milk to which the bacteria solution was added was 6.6. The soybean milk obtained (Sample B) showed a reduced grassy smell and other flavors of the soybean milk apart from the grassy smell, as well as the taste thereof and the texture were not adversely affected by the bacteria.

Comparison experiment

Sensory test regarding the grassy smells of Sample A (a comparative product) and Sample B (a product of this invention) were performed by 15 panel members by way of a pair evaluation method. The results obtained are shown in Table 1.

TABLE 1

| | Sample A produces a stronger grassy smell | Sample B produces a stronger grassy smell |
|---|---|---|
| Number of panelists | 15 | 0 |

20 ml of soybean milk produced by the same method as that of Sample A was put into a vial having a volume of 50 ml and allowed to stand at 80° C. for 15 minutes. 5 ml of the headspace gas was then collected and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 1.

Meanwhile, 0.25 ml of the bacteria solution was added to 20 ml of soybean milk produced by the same method as that of Sample A and left in contact therewith at 30° C. for 30 minutes. GLC was performed by the same method as that described above. The results obtained are shown in FIG. 2.

Figure 2:
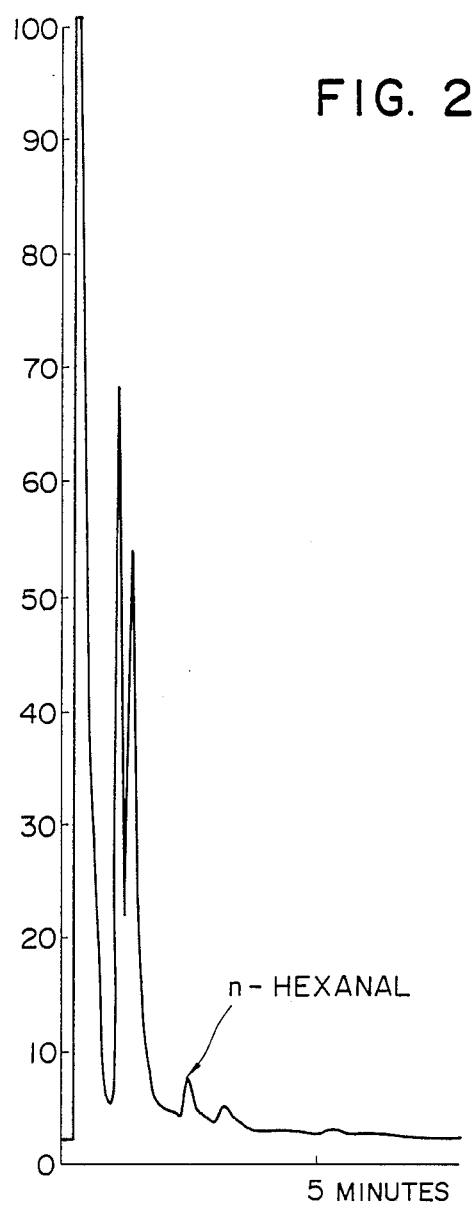
FIG. 2 is a gas chromatogram of the headspace gas when a solution of acetic acid bacteria is added to soybean milk.

In FIGS. 1 and 2, the peak area of n-hexanal on the GLC chart is 8.38 cm² when no bacteria solution was added (FIG. 1), while it is 0.15 cm² when the bacteria solution was added (FIG. 2). It can be seen from these results that the amount of n-hexanal contained in a food can be sufficiently reduced by using living bacteria bodies of acetic acid bacteria.

Example 2 (wheat flour dough)

20 ml of water was added to 4 g of wet bacteria bodies of *Acetobacter aceti* 3284 and the mixture was agitated and then allowed to stand at 60° C. for 30 minutes so that the bacteria bodies died to form a bacteria solution.

On the other hand, 150 ml of water was added to 300 g of wheat flour and mixed therewith for 15 seconds by a mixer to obtain wheat flour dough. The wheat flour dough obtained was allowed to stand at 30° C. for 30 minutes. The thus-obtained wheat flour dough produced a very strong smell of gluten. 20 g of the wheat flour dough was collected in a vial having a volume of 50 ml and allowed to stand at 80° C. for 15 minutes. 5 ml of the headspace gas was then collected and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 3.

Meanwhile, 140 ml of water and 10 ml of the baceteria solution were added to 300 g of wheat flour and mixed for 15 seconds by a mixer to obtain wheat flour dough. The wheat flour dough obtained was allowed to stand at 30° C. for 30 minutes. The pH of the wheat flour dough obtained was 6.8. The thus-obtained wheat flour dough produced a reduced smell of gluten.

20 g of the wheat flour dough was collected in a vial having a volume of 50 ml and allowed to stand at 80° C. for 15 minutes. 5 ml of the headspace gas was then collected and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 4.

Figure 3:
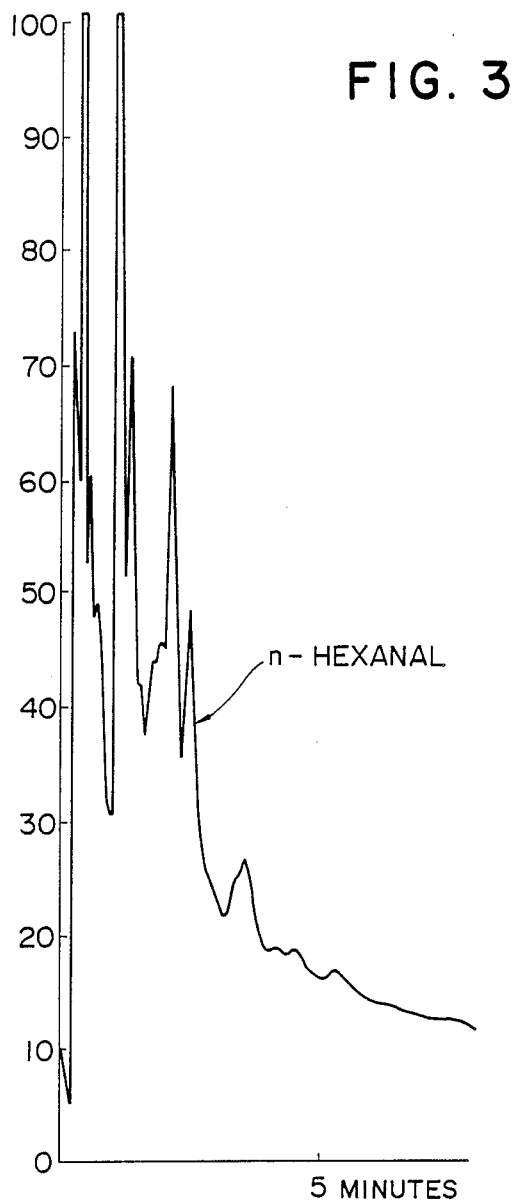
FIG. 3 is gas chromatogram of the headspace gas when no solution of acetic acid bacteria is added to wheat flour dough.
Figure 4:
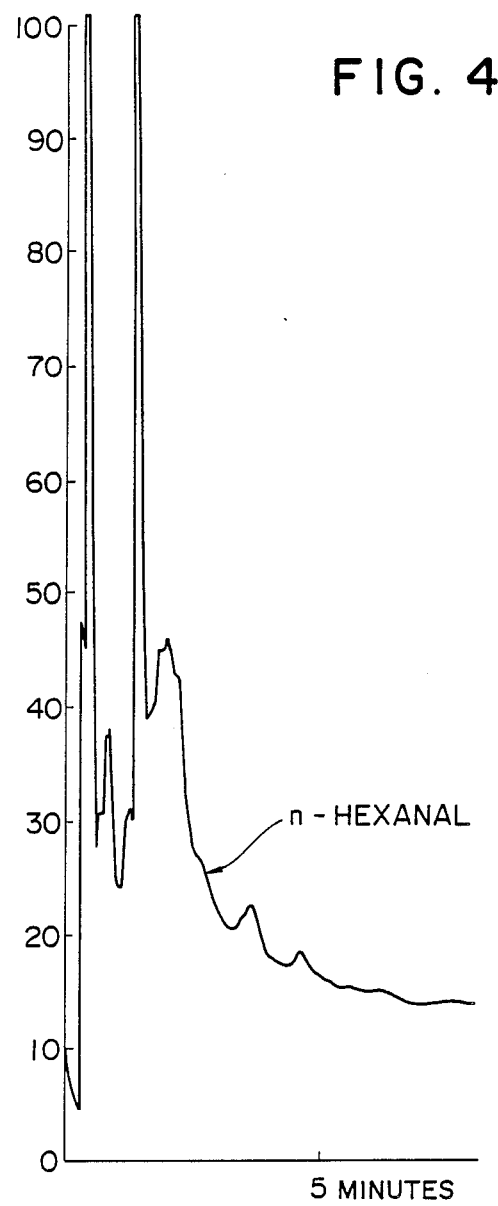
FIG. 4 is a gas chromatogram of the headspace gas when a solution of acetic acid bacteria is added to wheat flour dough.

In FIGS. 3 and 4, the peak area of n-hexanal on the GLC chart is 0.7 cm² when no bacteria solution was added (FIG. 3), while it is 0.005 cm² when the bacteria solution was added (FIG. 4). It can be seen from these results that the amount of n-hexanal contained in a food can also be reduced sufficiently by using dead bacetria bodies of acetic acid bacteria.

Example 3

Soybean milk was obtained by the same method as that of Example 1 with the exception that the contact times were 1 hour, 2 hours, 3 hours, 4 hours, 5 hours, 6 hours and 7 hours. Sensory test was performed by 15 panel members with respect to the soybean milk obtained. The results obtained from this tests are shown in Table 2.

TABLE 2

| | Time (hour) | | | | | | |
|---|---|---|---|---|---|---|---|
| | 1 | 2 | 3 | 4 | 5 | 6 | 7 |
| Mark | 4.8 | 4.7 | 4.1 | 3.7 | 3.2 | 2.6 | 2.1 |

The marks in the table are average values (rounded to two decimal places) for the marks obtained from a five-step evaluation in which the soybean milk of Example 1 (contact time: 30 minutes) was given 5 marks.

With a mark less than 3.0, the soybean milk produced a remarkably sour-sweet flavor and taste and was thus unsuitable as a soybean milk product.

REFERENCE EXAMPLE 1

(1) Optimum temperature

The optimum temperature for the oxidation of n-hexanal was examined by the following method:

20 ml of water was added to 4 g of wet bacteria bodies of *Gluconobacter suboxydans* IFO 12528 and the bacteria bodies were uniformly dispersed to obtain a bacteria solution.

Meanwhile, water was added to 100 g of defatted soybeans in a volume 6 times greater than that of the soybeans and the soybeans were ground for 1 minute in a mixer, filtered, and then heated at 100° C. for 10 minutes to obtain soybean milk.

Figure 5:
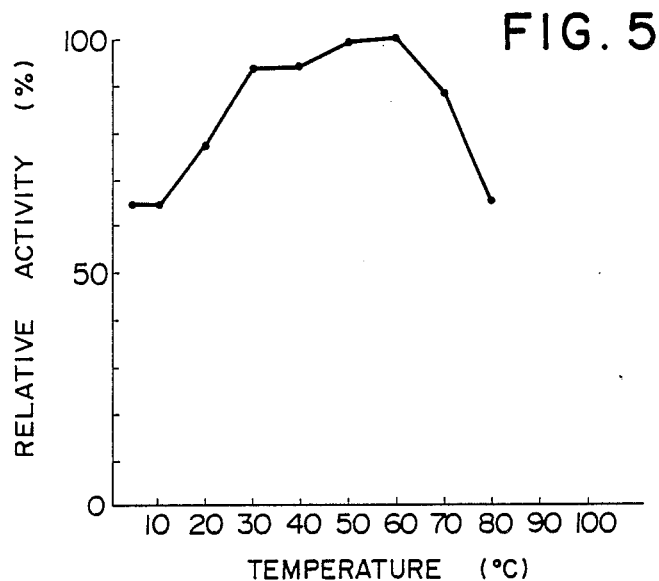
FIGS. 5 to 8 show an optimum temperature, a stable temperature, an optimum pH and a stable pH for acetic acid bacteria, respectively.

20 ml of the soybean milk obtained was collected in vials each having a volume of 50 ml and 0.25 ml of the bacteria solution was added to each of them. Reaction was then effected for 30 minutes at each of the following temperatures: 5° C., 10° C., 20° C., 30° C., 40° C., 50° C., 60° C., 70° C., and 80° C.. After each of the reaction mixtures had been allowed to stand for 15 minutes, 5 ml of the headspace gas was collected from each of the vials and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 5 in which the activity at 60° C. is considered as 100%.

(2) Stable temperature

A stable temperature for the oxidation of n-hexanal was examined by the following method:

20 ml of water was added to 4 g of wet bacteria bodies of *Gluconobacter suboxydans* IFO 12528 which were then uniformly dispersed to obtain a bacteria solution. 1 ml of the bacteria solution was collected in test tubes for fractional collection which were then allowed to stand for 15 minutes at the respective temperatures 30° C., 40° C., 50° C., 60° C., 70° C., 80° C., 90° C. and 100° C. and immediately cooled to obtain bacteria solutions.

Meanwhile, water was added to 100 g of defatted soybeans in a volume which was 6 times greater than the latter and the soybeans were ground for 1 minute in a mixer, filtered, and heated at 100° C. for 10 minutes to obtain soybean milk.

Figure 6:
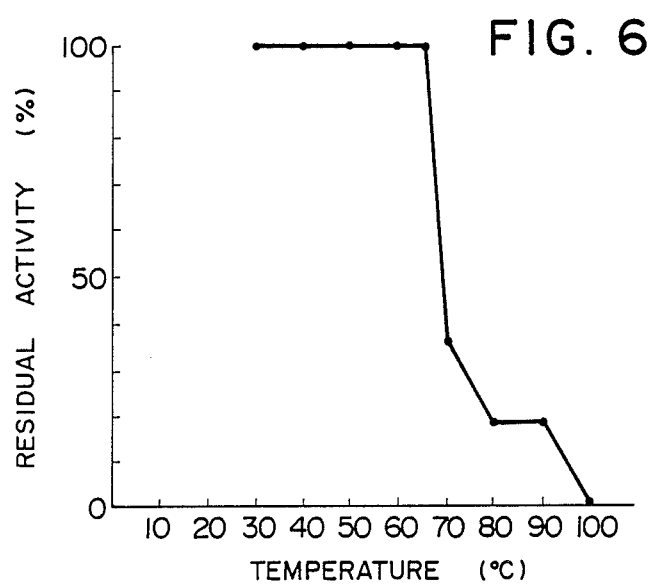

20 ml of the soybean milk obtained was collected in vials each having a volume of 50 ml. 0.25 ml of the respective bacteria solutions was added to the vials and the mixtures were then subjected to reaction at 30° C. for 30 minutes and immediately thereafter allowed to stand at 80° C. for 15 minutes. 5 ml of the headspace gas was then collected from each of the vials and subjected to GLC under the conditions of a column temperature of 100° C., a detector temperature of 250° C., sensitivity of $10^3 \times 16$, and a $N_2$ gas flow rate of 40 ml/min. The results are shown in FIG. 6 in which the activity at 30° C. is considered as 100%.

(3) Optimum pH

An optimum pH for the oxidation of n-hexanal was examined by the following method:

20 ml of water was added to 4 g of wet bacteria bodies of *Gluconobacter suboxydane* IFO 12528 which were then dispersed uniformly to obtain a bacteria solution.

Meanwhile, soybean milk was prepared by using buffers at different pH. Namely, McIlvaine buffer solutions (pH 2.5, 3.0, 4.0, 5.0, 6.0, 7.0, and 8.0) and 0.1 M Tris-Hcl buffer (pH 9.0) were added to 40 g of defatted soybeans in volumes which were six times greater than that of the soybeans and the soybeans were ground for 1 minute by a mixer and centrifuged. The supernatant was heated at 100° C. for 10 minutes and then cooled to obtain soybean milk.

Figure 7:
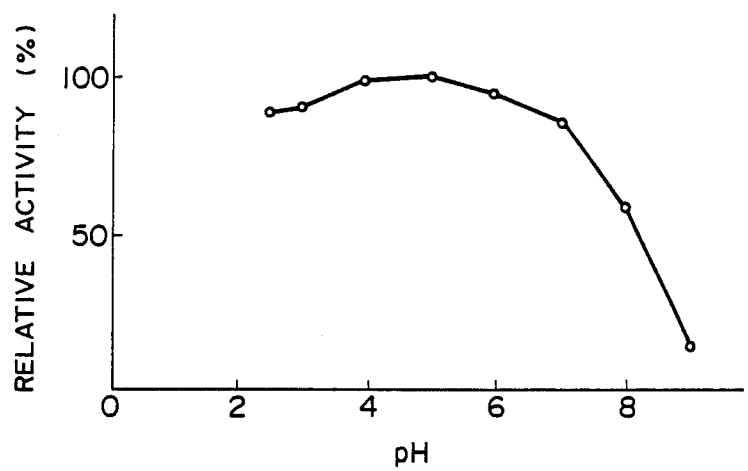

20 ml of the obtained soybean milk at different pH was collected in vials each having a volume of 50 ml and 0.25 ml of the bacteria solution was added thereto. The respective mixtures were then subjected to reaction at 30° C. for 30 minutes and immediately thereafter allowed to stand at 80° C. for 15 minutes. 5 ml of the headspace gas was then collected from each vial and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 7 in which the activity at pH 5.0 is considered as 100%.

(4) Stable pH

A stable pH for the oxidation of n-hexanal was examined by the following method:

Bacteria solutions at different values of pH were prepared by adding McIlvaine buffer solutions (respectively pH 2.5, 3.0, 4.0, 5.0, 6.0, 7.0 and 8.0) and 1 ml of a 0.1 M tris-HCl buffer solution (pH 9.0) to 0.16 g of wet bacteria bodies of *Gluconobacter suboxydans* IFO 12528 and allowing the respective mixtures to stand at room temperature for 30 minutes.

Meanwhile, water was added to 100 g of defatted soybeans in a volume six times greater than the latter and the soybeans were then ground for 1 minute in a mixer, filtered, and heated at 100° C. for 10 minutes to obtain soybean milk.

Figure 8:
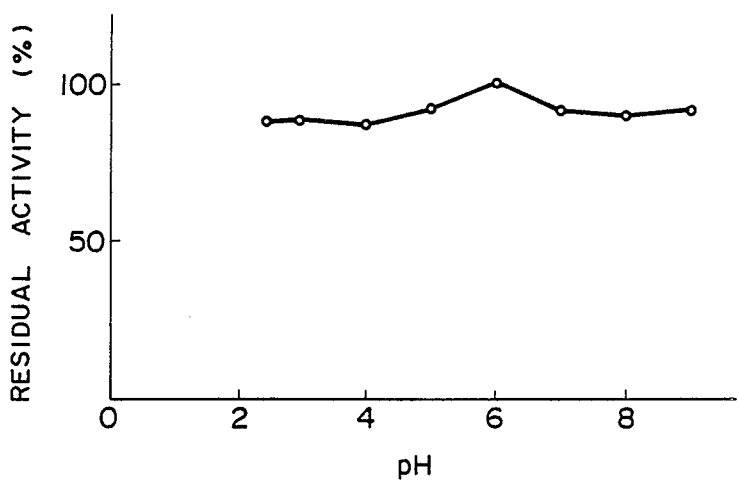

20 ml of the soybean milk was collected in vials each having a volume of 50 ml and 0.25 ml of the respective bacteria solutions were then added to the vials. The respective mixtures were then subjected to reaction at 30° C. for 30 minutes and immediately thereafter allowed to stand at 80° C. for 15 minutes. 5 ml of the headspace gas was collected from each of the vials and subjected to GLC under the conditions of a column temperature of 100° C., a detector temperature of 250° C., sensitivity of $10^3 \times 16$, and a $N_2$ gas flow rate of 40 ml/min. The results obtained are shown in FIG. 8 in which the activity at pH 6.0 is considered as 100%.

EXAMPLE 4

Water in amount of 22 ml was added to 2 g of acetic acid bacteria (*Acetobacter aceti* IFO 3284) and the solution was left for 30 minutes at 60° C. so that the bacteria were dead. The dead bacteria were suspended uniformly and the temperature of the suspension was adjusted to 60° C. The suspension liquid of adjusted temperature and 1.5 wt. % alginic acid salt solution were mixed at a ratio of 1:1.5 and 10 ml of the mixture was charged in an injector and dripped into a 15 wt. % solution of calcium chloride After the dripping, the calcium chloride solution was stirred whole through a day at 50° C. and granular matters were separated thus obtaining about 55 g of granular gel (immobilized acetic acid bacteria) containing ungrowable acetic acid bacteria.

50 g of the thus obtained immobilized acetic acid bacteria was charged in a column of a size 2×50 cm. While adjusting the column temperature at 50° C., a soybean milk was made to pass through the column at a flow rate of 2 ml/minute. The period of stay of the soybean milk in the column was 30 minutes. The soybean milk used as the test material was prepared by adding 600 ml of water to 100 g of defatted soybean, grinding the mixture for 1 minute by a mixer, filtrating the ground mixture and effecting a heat treatment for 10 minutes at 100° C.

After the contact with immobilized acetic acid bacteria, grassy smell of the soybean milk had been reduced but a precipitation of soybean protein was observed. The smell peculiar to the acetic acid bacteria was not felt in the thus treated soybean milk.

EXAMPLE 5

Water in amount of 22 ml was added to 2 g of growable acetic acid bacteria (*Acetobacter aceti* IFO 3284) so as to form a bacteria solution with uniform suspension of bacteria. The suspension was heated to 37 to 40° C. Meanwhile, κ-carrageenan was dissolved in 0.8 wt. % aqueous physiological saline so as to from 5 wt. % solution of ↓-carrageenan. The bacteria solution and the ↓-carrageenan solution were mixed together at such a ratio that the mixture has a ↓-carrageenan concentration of about 3.5%. The mixture was then charged in an injector of 10 ml capacity and was dripped into a 20 wt. % solution of potassium chloride. The solution was then left whole through a day at 5° C. and granular gel was separated thus obtaining about 70 g of granular gel (immobilized acetic acid bacteria) containing ungrowable acetic acid bacteria.

50 g of the thus obtained immobilized acetic acid bacteria was charged in a column of a size 2×50 cm. While adjusting the column temperature at 35° C., a soybean milk as used in Example 4 as a raw material was made to pass through the column at a flow rate of 2 ml/minute. The period of stay of the soybean milk in the column was 30 minutes.

After the contact with immobilized acetic acid bacteria, the grassy smell of the soybean milk acetic acid bacteria had been reduced and no precipitation of soybean protein was observed. The smell peculiar to the acetic acid bacteria was not felt in the thus treated soybean milk.

EXAMPLE 6

20 ml of soybean milk of the same type as that used in Example 4 was collected in a 50 ml vial and was left for reaction for 30 minutes at 50° C. Immediately, after the reaction, 5 ml of headspace gas was extracted and was subjected to GLC under the conditions of column temperature of 100° C., detector temperature of 250° C., sensitivity of $10^3 \times 16$ and $N_2$ gas flow rate of 40 ml/min. The result is shown in FIG. 9.

On the other hand, GLC was conducted by the same process as above, except that the soybean milk has made to contact with acetic acid bacteria immobilized by the same method as Example 4. The result is shown in FIG. 10.

At the same time, GLC was conducted by the same process as above, except that the soybean milk has made to contact with acetic acid bacteria immobilized by the same method as Example 5. The result is shown in FIG. 11.

Figure 9:
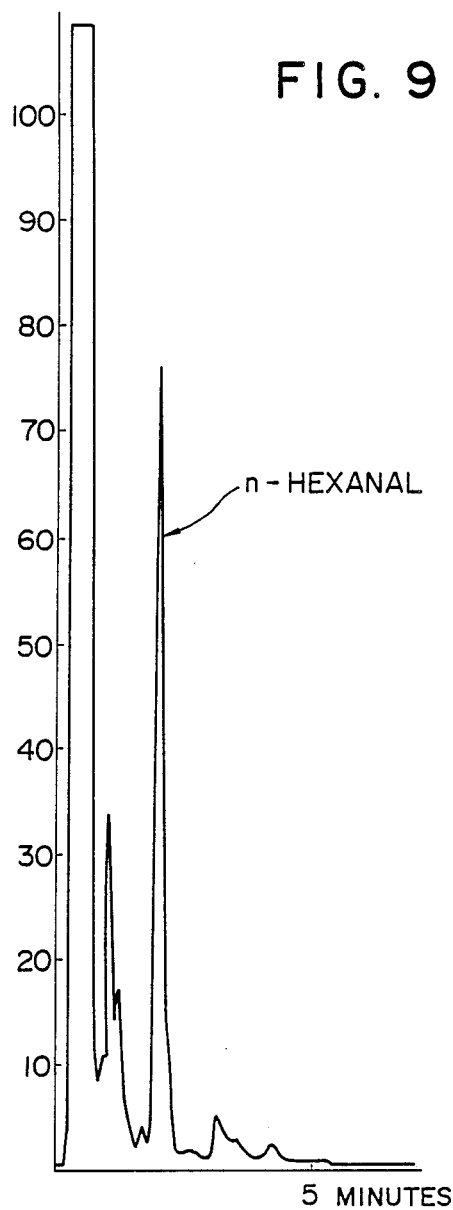
FIG. 9 is a gas chromatogram of the headspace gas when soybean milk has not brought into contact with immobilized acetic acid bacteria.
Figure 10:
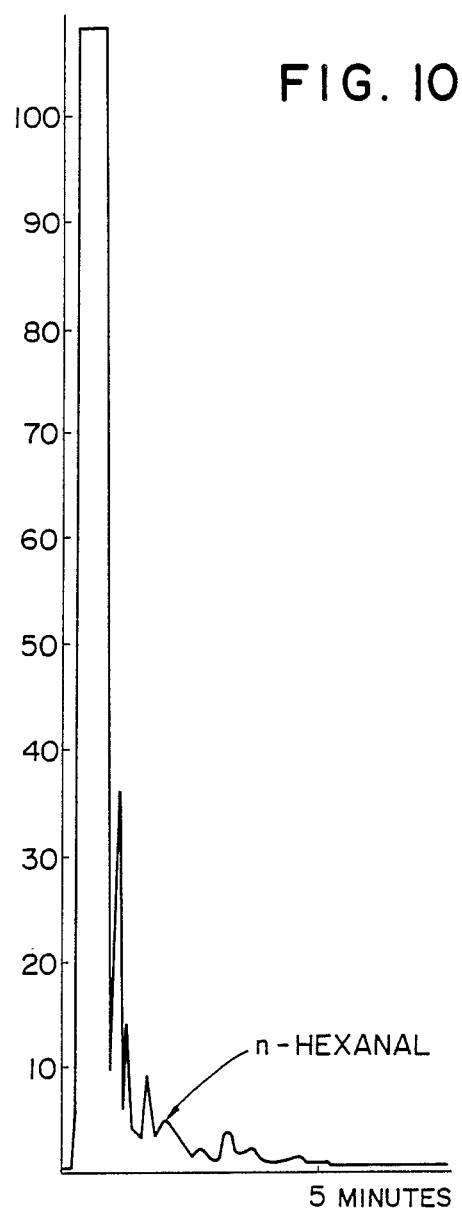
FIGS. 10 and 11 are gas chromatograms of the headspace gas when soybean milk has brought into contact with immobilized acetic acid bacteria.
Figure 11:
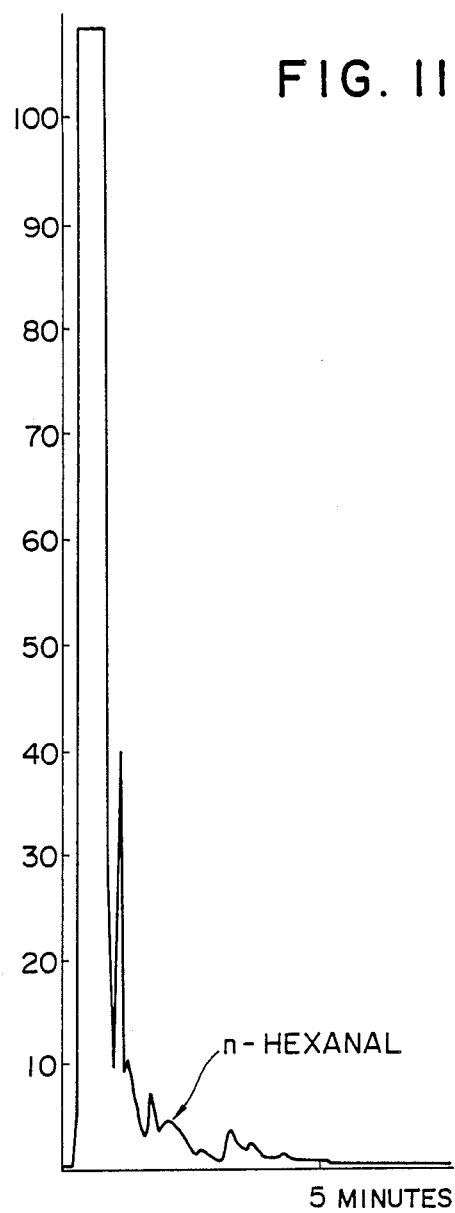

From FIGS. 9, 10 and 11, it will be seen that the peak area on GLC chart is 2.18 cm$^2$ when the soybean milk has not contacted with immobilized acetic acid bacteria (see FIG. 9), whereas the peak area was 0.13 cm$^2$ in each of the cases where the soybean milk has been contacted with immobilized acetic acid bacteria, as shown in FIGS. 10 and 11.

From these facts, it is understood that the n-hexanal in the foods has been sufficiently reduced in amount as a result of contact with immobilized acetic acid bacteria.

EXAMPLE 7

Sensory test was conducted on the soybean milk prepared through contact with immobilized acetic acid bacteria in Example 5 by 20 panel members.

Sensory test also was conducted by 20 panel members on a soybean milk prepared by the following process, for a comparison purpose (Comparative example 1).

Water in amount of 22 ml was added to 2 g of alive bacteria (*Acetobacter aceti* IFO 3284) so as to uniformly disperse the bacteria, thus obtaining 24 ml of bacteria solution. 15 ml of the thus obtained bacteria solution (thus containing 1.25 g of bacteria as in the case of Example 5) was added to 260 m of soybean milk as used in Example 4 as a raw material and was made to react therewith for 30 minutes at 50° C.

|  | Example 2 | Comparison Ex. 1 |
| --- | --- | --- |
| Number of panel members who felt bacterial smell | 0 | 20 |

As will be seen from the above table, the number of the panel members who felt bacteria smell in the soybean milk processed by the method of the invention was 0 (zero), while the number of panel members who felt bacetria smell in the soybean milk of comparison example 1 was 20. Thus, the method of the present invention does not cause the smell of bacteria after the completion of the process, even when the amount of bacteria used is large.

REFERENCE EXAMPLE 2

(Optimum Temperature)

Figure 12:
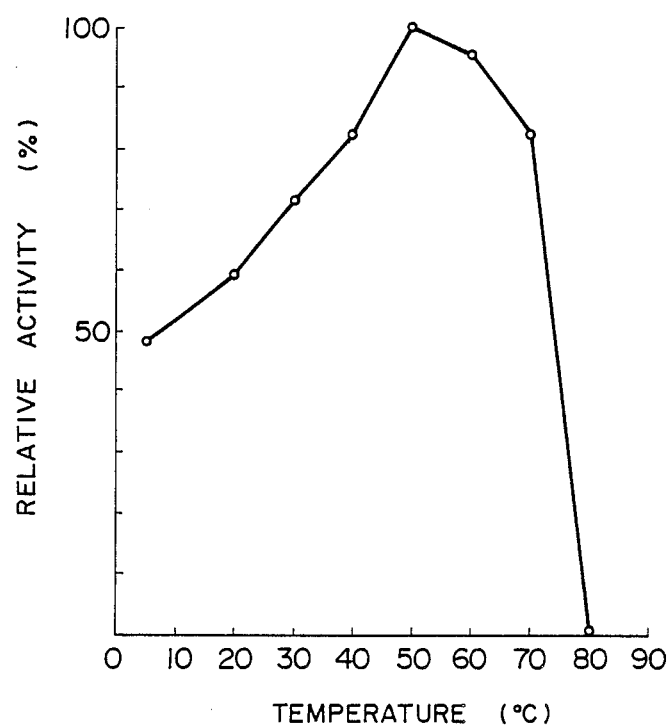
FIGS. 12 and 13 show, respectively, relationship between relative activity and temperature of immobilized acetic acid bacteria and relationship between residual activity and temperature of immobilized acetic acid bacteria.

The following test was conducted in order to study the optimum temperature for oxidizing n-hexanal. 20 m of n-hexanal solution having n-hexanal concentration of 40 ppm was collected in each of a plurality of vials having an internal volume of 50 ml. A granular gel (immobilized acetic acid bacteria) produced by the same method as Example 5 was added to the n-hexanal solution in amount of 1.5 g, thus preparing samples. The thus prepared samples were made to react with different temperatures: namely at 5, 20, 30, 40, 50, 60, 70 and 80° C., respectively, and then left at 80° C. for 15 minutes. Headspace gases was then extracted from each vial in amount of 5 ml and was subjected to GLC which was conducted at column temperature of 100° C., detection temperature of 250° C., sensitivity of $10^3 \times 16$, and $N_2$ gas flow rate of 40 ml/minute. The result of the test is shown in FIG. 12, using the activity at 50° C. as 100% activity.

(Stable Temperature)

Figure 13:
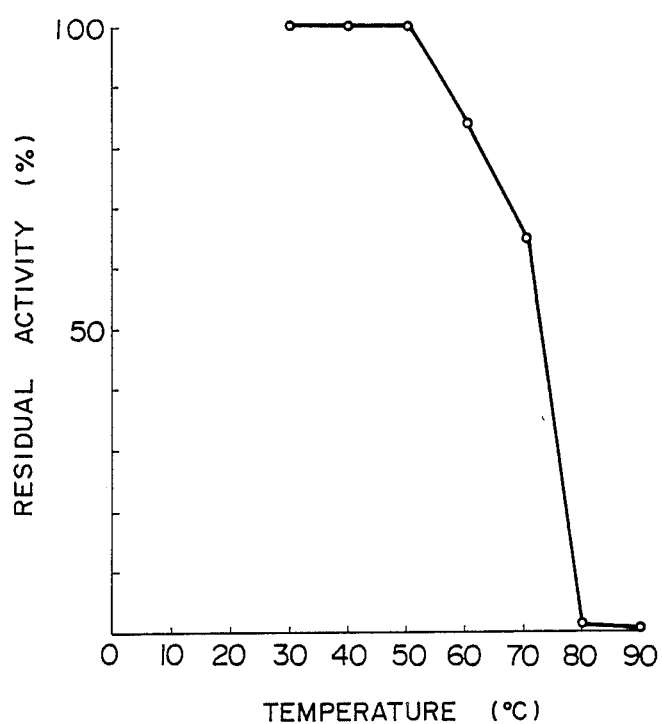

The following test was conducted in order to study the stable temperature for oxidizing n-hexanal. Mixture of 1.5 g of granular gel (immobilized acetic acid bacteria) prepared by the same method as Example 5 and 2 ml of water was collected in each of a plurality of test tubes so as to be used as samples. These samples were left for 15 minutes at different temperatures of 30, 40, 50, 60, 70, 80 and 90° C., and cooled immediately thereafter. Meanwhile, 20 ml of n-hexanal solution of 40 ppm concentration was collected in each of a plurality of vials each having an internal volume of 50 ml. The granular gels treated at different temperatures were then added to the n-hexanal solution in the respective vials and the mixtures were left for 30 minutes at 50° C. Then, 5 ml of headspace gas was extracted from each vial and was subjected to GLC conducted at column temperature of 100° C., detection temperature of 250° C., sensitivity of $10^3 \times 16$ and $N_2$ gas flow rate of 40 ml/minute. The result is shown in FIG. 13, using the activity at 30° C. as 100% activity.

(Optimum pH)

Figure 14:
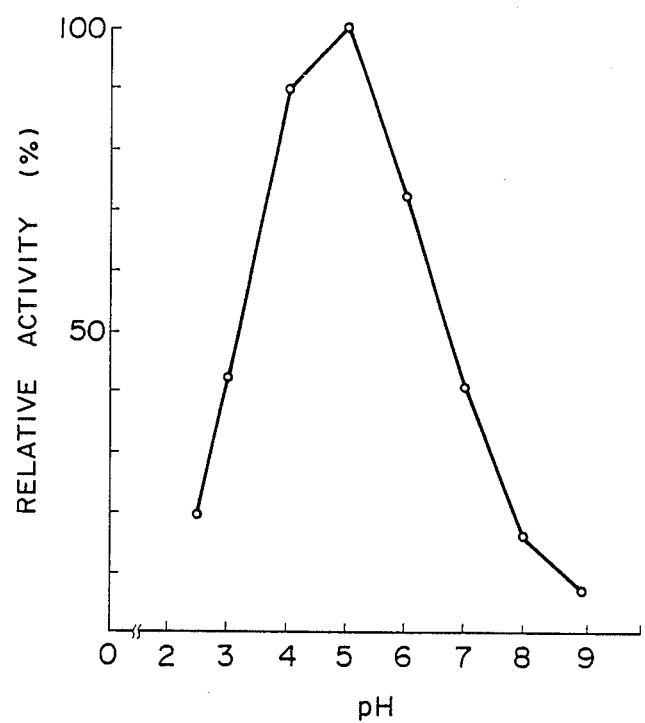
FIGS. 14 and 15 show, respectively, relationship between relative activity and pH of immobilized acetic acid bacteria and relationship between residual activity and pH value of immobilized acetic acid bacteria.

In order to study the optimum pH for oxidizing n-hexanal, the following test was conducted. Samples of n-hexanal solution of 40 ppm concentration were prepared by using buffer solutions of different pH (McIlvaine buffer solutions (pH 2.5, 3.0, 4.0, 5.0, 6.0, 7.0 and 8.0) and 0.1 M tris HCl buffer solution (9.0)). The n-hexanal solutions having different pH in amount of 20 m were collected in vials having internal volume of 50 ml and 1.5 g of granular gel (immobilized acetic acid bacteria) obtained in the same way as Example 5 was added thereto, and the mixtures were held at 5° C. for 30 minutes. Then, 5 ml of headspace gas was extracted from each vial and was subjected to GLC conducted at column temperature of 100° C., detection temperature of 250° C., sensitivity of $10^3 \times 16$ and $N_2$ gas flow rate of 40 ml/minute. The result is shown in FIG. 14, using the activity at pH 5.0 as 100% activity.

(Stable pH)

In order to study the stable pH for oxidizing n-hexanal, the following test was conducted. 2 ml of buffer solutions of different pH (McIlvaine buffer solutions (pH 2.5, 3.0, 4.0, 5.0, 6.0, 7.0 and 8.0) and 0.1 M tris HCl buffer solution (9.0)) were added to 1.5 g of granular gel (immobilized acetic acid bacteria) obtained in the same way as Example 5, and the mixtures were held at 5° C. for 30 minutes. Meanwhile, 20 ml of n-hexanal solution of 40 ppm concentration was charged in each of a plurality of vials having internal volume of 50 ml. 1.5 g of the granular gel (immobilized acetic acid bacteria) was added to the n-hexanal solution in each vial.

Figure 15:
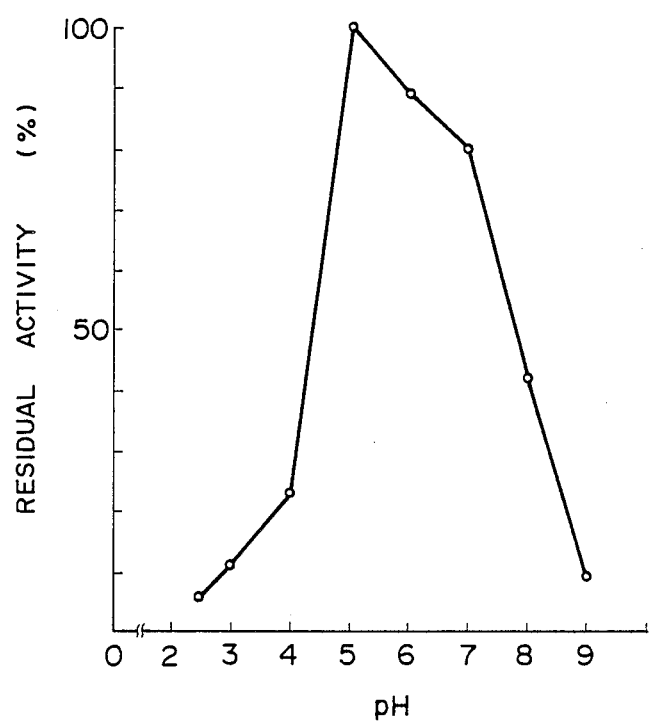

Then, 5 ml of headspace gas was extracted from each vial and was subjected to GLC conducted at column temperature of 100° C., detection temperature of 250° C., sensitivity of $10^3 \times 16$ and $N_2$ gas flow rate of 40 ml/minutes. The result is shown in FIG. 15, using the activity at pH 5.0 as 100% activity.

EXAMPLE 8

1 g of wet bacteria (*Acetobacter aceti* IFO 3284) was collected in a test tube to which added was 11 ml of water so as to uniformly disperse the bacteria, thus obtaining a bacteria solution. The bacteria solution was then heated at 60° C. for 30 minutes so as to inactivate membrane-bound alcohol dehydrogenase.

Subsequently, 2.5 ml of the thus prepared bacteria solution was added to 200 ml of a commercially available beer (alcohol content 4.5%, pH 4.3) which has been stored at room temperature for 6 months, an the mixture was left for reaction at 30° C. for 30 minutes. The thus treated beer did not exhibit any off-flavor attributable to the presence of medium chain aldehydes such as trans-2-nonenal. In addition, the alcohol content of the beer after the treatment was 4.5%: namely, no reduction in alcohol content was observed at all.

COMPARISON EXAMPLE 2

The same beer as that used in Example 8 was treated by the same method as Example 8, except that the bacteria solution was not heat-treated, i.e., the inactivation of membrane-bound alcohol dehydrogenase was omitted. The treated beer showed a significant reduction of alcohol content down to 2.0%, though it exhibited no off-flavor attributable to the presence of medium chain aldehydes such as trans-2-nonenal.

Thus, the beer obtained in Example 8 showed alcohol content of 4.5%, while the beer obtained in Example 2 showed alcohol content of 2.0%. This clearly shows that the method of the invention effectively reduces the off-flavor in alcohol containing foods due to presence of medium chain aldehydes, without causing any reduction in the alcohol content in the foods.

EXAMPLE 9

Water was added in amount of 22 ml to 2 g of acetic acid bacteria (*Acetobacter aceti* IFO 3284) and the mixture was heat-treated at 60° C. for 30 minutes, followed by blending so as to prepare a bacteria solution having uniform suspension of bacteria. The temperature of the bacteria solution was then adjusted to 60° C. Then, the bacteria solution and 1.5 wt. % alginic acid salt solution were mixed together at a ratio of 1:1.5 and the mixture was dripped by an injector into 15 wt. % solution of calcium chloride The mixture was then stirred whole through a day at 5° C., whereby about 55 g of granular gel (immobilized acetic acid bacteria) was obtained. Then, 50 g of the granular gel was placed in a 500 ml beaker together with 200 ml of the same beer as that used in Example 8 and the mixture was left for reaction at 30° C. for 30 minutes. The thus treated beer did not show at all any off-flavor attributable to presence of medium chain aldehydes such as trans-2-nonenal. The alcohol content of the beer after the treatment was 4.5%: namely, no reduction in the alcohol content was caused by the treatment.

ADVANTAGES OF THE INVENTION

In accordance with the first embodiment of the present invention, an off-flavor in foods containing medium chain aldehydes can be reduced by bringing these foods that contain medium chain aldehydes into contact with acetic acid bacteria, in a state wherein the acetic acid bacteria substantially does not proliferate, without resulting in any loss of the taste, flavor or texture of these foods.

In addition, the use of acetic acid bacteria enables treatments for reducing an off-flavor to be carried out in a wide temperature range and a wide pH range. In particular, it is possible to reduce an off-flavor in foods at a high temperature or in a relatively acid range.

The method in accordance with the second embodiment of the present invention makes it possible to reduce the off-flavor attributable to presence of medium chain aldehydes in liquid foods, by allowing the liquid food containing medium chain aldehydes with immobilized acetic acid bacteria. In addition, since the acetic acid bacteria brought into contact with foods containing medium chain aldehydes have been immobilized, any undesirable transfer of bacteria into the foods is avoided. It is, therefore, possible to eliminate any risk for the foods containing medium chain aldehydes to loose its flavor or taste due to smell inherent to the acetic acid bacteria.

It is also to be noted that any deterioration of appearance of food products attributable to contamination by bacteria is prevented even when the foods containing medium chain aldehydes are transparent.

According to the third embodiment of the present invention, it is possible to reduce an off-flavor in alcohol containing foods due to medium chain aldehydes generated in the course of production of the alcohol containing foods or during storage of the same without causing any reduction in the alcohol content, by causing acetic acid bacteria to contact with the alcohol containing foods containing medium chain aldehydes after inactivation of membrane-bound alcohol dehydrogenase through effecting a heat-treatment of the acetic acid bacteria at 60 to 80° C.

We claim:

1. A method of reducing off-flavor in a foodstuff containing medium chain aldehydes, comprising:
contacting said foodstuff for no more than 5 hours at a temperature of from 5° to 80° C. at a pH of no more than 8.5 with an amount of acetic acid bacteria sufficient to achieve off-flavor reduction in said foodstuff, said acetic acid bacteria having the capability of growing and not significantly proliferating during the period of contact.

2. A method of reducing off-flavor in a foodstuff containing medium chain aldehydes, comprising:
contacting said foodstuff for less than 10 hours at a temperature of from 5 to 80° C. at a pH of no more than 8.5 with an amount of acetic acid bacteria sufficient to achieve off-flavor reduction in said foodstuff and for a time sufficient to achieve said off-flavor reduction, said acetic acid bacteria having the capability of growing and proliferating.

3. A method of reducing off-flavor in a foodstuff containing medium chain aldehydes, comprising:
contacting said foodstuff for less than 10 hours at a temperature of from 5–60° C. at a pH of less than 8.0 with an amount of acetic acid bacteria sufficient to achieve off-flavor reduction in said foodstuff, said acetic acid bacteria being immobilized and having the capability of growing but which do not significantly proliferate during contact with said foodstuff.

4. The method of claim 3, wherein said acetic acid bacteria are immobilized by being entrapped, cross-linked or bonded to a carrier.

5. The method of claim 3, wherein said acetic acid bacteria are immobilized by being entrapped.

6. The method of claim 5, wherein said acetic acid bacteria are immobilized by preparing an aqueous solution of potassium chloride or calcium chloride containing acetic acid bacteria and dispensing this solution in an aqueous solution of $\downarrow$-carrageenan, and then gelatinizing the resulting solution.

7. A method of reducing off-flavor in a foodstuff containing medium chain aldehydes, comprising:
contacting said foodstuff at a temperature of from 5 to 60° C. at a pH of no more than 8.0 with an amount of acetic acid bacteria sufficient to achieve off-flavor reduction in said foodstuff and for a time sufficient to achieve said off-flavor reduction, said acetic acid bacteria being immobilized and not having the capability of growing and proliferating.

8. The method of claim 7, wherein said acetic acid bacteria are immobilized by being entrapped, cross-linked or bonded to a carrier.

9. The method of claim 7, wherein said acetic acid bacteria are immobilized by being entrapped.

10. The method of claim 9, wherein said acetic acid bacteria are immobilized by preparing an aqueous solution of potassium chloride or calcium chloride containing acetic acid bacteria and dispersing this solution in an aqueous solution of $\downarrow$-carrageenan, and then gelatinizing the resulting solution.

11. A method of reducing off-flavor in a foodstuff containing alcohol and medium chain aldehydes, comprising:
contacting said foodstuff at a temperature of from 5 to 80° C. at a pH of no more than 8.5 with an amount of acetic acid bacteria sufficient to achieve off-flavor reduction in said bacteria being membrane-bound and said bacteria having been deactivated by heat treatment at a temperature of from 60–80° C.

12. The method of claim 11, wherein the step of contacting is achieved by adding said acetic acid bacteria to said foodstuff.

13. The method of claim 11, wherein the step of contacting is achieved by adding a dispersion of said acetic acid bacteria to said foodstuff.

14. The method of claim 11, wherein said acetic acid bacteria are immobilized.

15. The method of claim 14, wherein contact of said foodstuff with said immobilized acetic acid bacteria occurs at a temperature of from 5 to 60° C.

16. The method of claim 14, wherein contact of said foodstuff with said immobilized acetic acid bacteria occurs at a pH of no more than 8.0.

17. The method of claim 11, wherein said foodstuff containing alcohol and medium chain aldehydes is an alcoholic beverage.

18. A method of reducing off-flavor in a foodstuff containing medium chain aldehydes, comprising:
contacting said foodstuff at a temperature of from 5–80° C. at a pH of no more than 8.5 with an amount of acetic acid bacteria sufficient to achieve off-flavor reduction in said foodstuff and for a time sufficient to achieve off-flavor reduction, said acetic acid bacteria having been heat treated to a temperature sufficient to place the bacteria in a non-growing state.

19. The method of claim 18, wherein said heat treatment of said acetic acid bacteria occurs at a temperature of from 40 to 60° C. for 30 to 60 minutes.

* * * * *